Oct. 21, 1952 W. E. GLENN, JR 2,615,135
MASS ANALYZING APPARATUS
Filed June 20, 1950

INVENTOR.
WILLIAM E. GLENN, Jr.
BY Roland A. Anderson
ATTORNEY.

Patented Oct. 21, 1952

2,615,135

UNITED STATES PATENT OFFICE 2,615,135

MASS ANALYZING APPARATUS

William E. Glenn, Jr., Berkeley, Calif., assignor to the United States of America as represented by the United States Atomic Energy Commission Application June 20, 1950, Serial No. 169,171

10 Claims. (Cl. 250—41.9)

The present invention relates generally to the segregation and identification of component elements and compounds in a mixture of unknown quality and more particularly relates to quantitative and qualitative mass analysis of ionizable mixtures.

Present day research in the fields of physics and chemistry, as well as many other theoretical and industrial fields, has emphasized the need for adequate analyzing techniques adapted to rapidly identify component elements and compounds comprising unknown mixtures. In the effort to fulfill this need numerous types of methods and apparatus have been developed, among which mass spectrometry has proven one of the more satisfactory. Rather rapid and accurate analysis may be accomplished by electromagnetic separation; however, the magnetic field of necessity associated with the apparatus presents certain difficulties. In order to establish the required magnetic field it is necessary to provide rather large and cumbersome equipment which for many applications is disadvantageous not only because of space and weight requirements but also because of the high cost of construction. Thus despite the success of mass spectrometry in the field of analysis it still remains for a simple, accurate, rapid acting, and inexpensive apparatus to be developed which will fulfill the need therefor.

Accordingly, it is an object of the present invention to provide an improved method and means for the rapid and accurate analysis of the components of a mixture in accordance with the individual mass numbers thereof.

Another object of the present invention is to provide an improved method and means of electro-statically accomplishing mass analysis.

Still another object of the present invention is to provide a very compact means for analyzing the constituent masses of a mixture.

A further object of the present invention is to provide an improved means for acting upon ions with a combination of direct and alternating electrical fields to identify ions of different masses.

A still further object of the present invention is to provide an improved method and means for producing controlled oscillation of an ion beam to separate and identify the ions of different masses therein.

Figure 1:
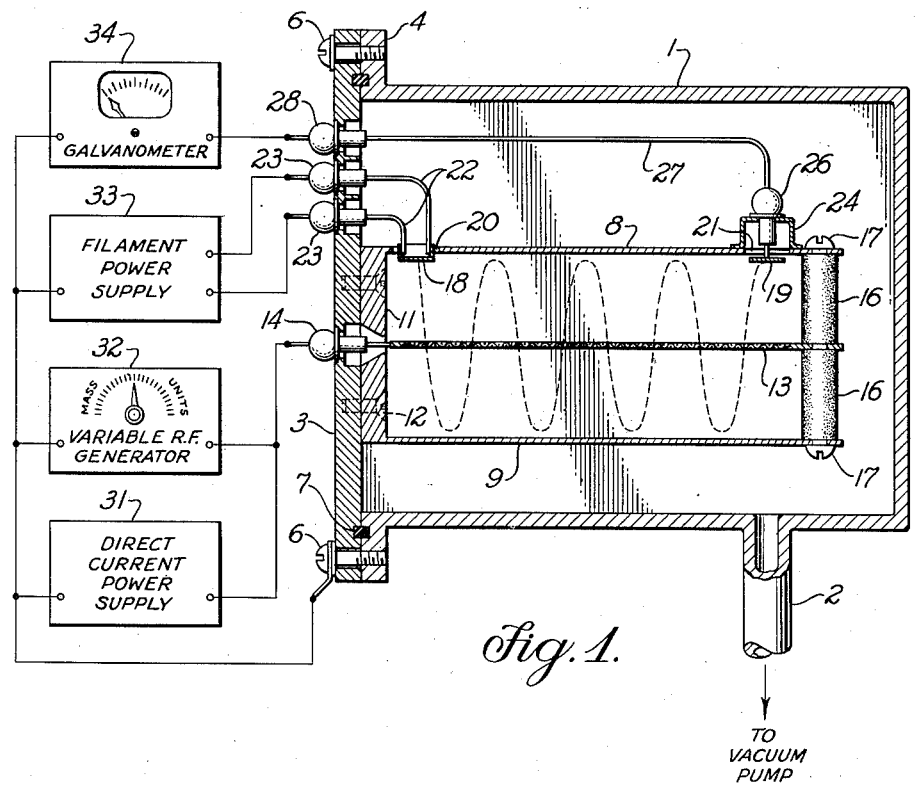
Figure 2:
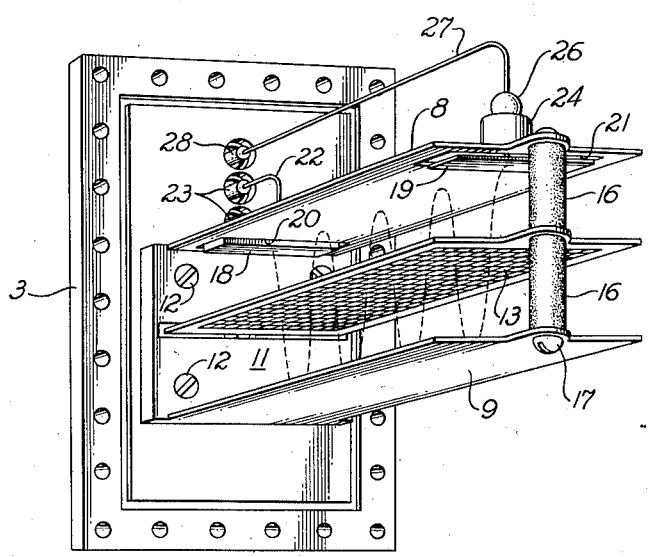

Many other possible objects, advantages, and uses of the invention will become apparent from the following disclosure taken together with the appended drawings wherein:

Figure 1 is a longitudinal cross section view of one embodiment of the invention with associated electrical connections shown in block form, and Fig. 2 is an isometric projection of the same embodiment shown in Fig. 1 with the cover removed to show the physical relation of the elements thereof.

Considering the physical characteristics and elements of the embodiment of the invention shown in Figs. 1 and 2, it will be noted that the apparatus is enclosed by an envelope 1 having a pipe 2 leading therefrom to a vacuum pump or system (not shown) whereby the interior of the envelope may be evacuated to the proper operating pressure. Envelope 1 may take the form of a box or cylinder open at one end and preferably having a flange 4 about the open end thereof, thereby facilitating the fastening thereto of envelope closure means such as face plate 3 which may be secured by means of bolts or screws 6 passing through face plate 3 and engaging flange 4, as shown in Fig. 1. The joint between envelope 1 and face plate 3 is maintained vacuum tight by an annular gasket 7 fitting into corresponding grooves in face plate 3 and flange 4.

Within envelope 1 there is centrally situated an electrode arrangement consisting of a pair of flat parallel metallic plates 8 and 9 extending substantially perpendicular to face plate 3 into envelope 1 and electrically and mechanically joined together by a metallic end piece 11 which may either be integrally formed with plates 8 and 9 or secured thereto by suitable means. End plate 11 abuts face plate 3 and is rigidly secured thereto, as for example, by machine screws 12 passing through end plate 11 and threaded into face plate 3. Midway between electrode plates 8 and 9 and parallel thereto, there is situated a third or intermediate electrode 13 of approximately the same length and width as plates 8 and 9, and formed of a metallic mesh or screen of a suitable size to allow passage therethrough of electrified particles. Intermediate electrode 13 is secured at one end to a lead-in-insulator 14, such as a Kovar-glass seal, having a centrally located conductor therethrough, which in turn extends through both face plate 3 and end plate 11 in fixed vacuum tight relation thereto, thereby supporting intermediate electrode 13 and providing an electrical connection thereto exterior to envelope 1. At the other end of intermediate electrode 13 there is provided a pair of insulators 16 of equal length separating intermediate electrode 13 from plates 8 and 9 and providing insulation between intermediate electrode 13 and plates 8 and 9 as well as mechanical rigidity and support of one terminus of the electrode assembly by virtue of screws 17 engaging insulators 16 and urging intermediate electrode 13 and plates 8 and 9 into intimate bearing relationship with opposite ends of insulators 16.

Before proceeding with the description it should be noted that the above-described electrode assembly consists of a pair of plate electrodes parallel to and equidistant from an intermediate wire mesh electrode, all being secured together in a rigid assembly with the plate electrodes being electrically connected to the surrounding envelope and the intermediate electrode being electrically connected to an external terminal.

Also within envelope 1, there is provided an ion source or filament 18 and an ion collector 19, each of which may advantageously consist of a metal strip oriented with its major dimension perpendicular to the major dimension of the plate electrodes 8 and 9; however, other suitable types of sources and collectors, as well as relative orientation thereof, may be employed. In the illustrated embodiment of the invention the filament 18 and the collector 19 are disposed parallel to and adjacent opposite ends of plate electrode 8 and in close proximity to the intermediate electrode presented face of plate 8. In order to provide for easy removal of filament source 18 and collector 19 a pair of apertures 20 and 21 are formed in plate electrode 8 directly above filament 18 and collector 19 and of slightly larger size than these elements. Filament 18 is supported in position by a pair of rigid filament wires 22 secured to opposite edges thereof and secured to a pair of insulators 23 extending through face plate 3 in fixed relation thereto. In the illustrated embodiment of the invention insulators 23 are of the type having a central conducting portion connecting external terminals to filament wires 22 internal to envelope 1 and having an external metal collar which may be joined as by soldering to face plate 3 about the aperture therein through which the insulator extends to form a vacuum tight seal; however, it will be appreciated that numerous types of filament supporting and energizing means may be employed, as well as various types of insulators and vacuum seals in connection therewith. For many applications of the invention it is advantageous to provide a readily removable filament which may of course be accomplished by conventional mechanical apparatus, all within the scope of the invention.

Collector 19 may be conveniently mounted by means of an inverted cup shaped bracket 24 disposed above the center of aperture 21 and secured to the top surface of plate electrode 8. An insulator 26 of the type having a central conductor therethrough, extending through the top of bracket 24, is rigidly secured to collector 19 whereby collector 19 is supported in position. The length of insulator 26, or of some intermediate connecting link, such as rigid wire, is chosen so that collector 19 is disposed a short distance below the lower face of plate 8, equal to the spacing of filament 18 from plate 8 for reasons set forth below in the description of operation of the invention. Connected to the top of the conductor extending through insulator 26 is a collector lead 27 extending therefrom toward face plate 3, in the vicinity of which lead 27 electrically contacts the central conductor of an insulator 28 of the same or similar type as described above, which extends through face plate 3 in vacuum tight relation thereto and presents a terminal external to envelope 1 which is electrically connected to collector 19.

It will thus be noted that internal to envelope 1 there is provided, in addition to the previously described electrode assembly, a filament and a collector disposed intermediate plate electrodes 8 and 9 and in close proximity with plate 8 at opposite ends thereof, with associated electrical leads extending outside of envelope 1 in insulated relation thereto and providing connections for energization of filament 18 and measurement of the current at collector 19.

Considering an electrical system adapted for use with the above-described elements and referring to Fig. 1 for illustration thereof, it will be noted that a direct current power supply 31 is connected between envelope 1 and the central conductor of insulator 14 which leads to intermediate electrode 13; envelope 1 being connected to the positive side of power supply 31 and to electrodes 8 and 9. In addition to the direct current voltage applied between electrodes 8 and 9 and intermediate electrode 13, there is applied an alternating voltage therebetween by means of an alternating current power supply 32 connected across D. C. power supply 31. A. C. power supply 32 may conveniently comprise a variable frequency radio-frequency voltage generator for the mode of operation contemplated by the illustrated embodiment, as will be clarified in the following description of operation, and thus to preclude ambiguity the A. C. power supply will hereinafter be referred to as R. F. generator 32.

Heating current for filament 18 is provided by a filament power supply 33 which is connected between filament leads 22 through lead-in-insulators 23 and is connected to the positive lead of D. C. power supply 31. One further element completes the electrical circuit of the device, and that is a current measuring device such as a galvanometer 34 which is connected between envelope 1 and collector 19 through lead-in-insulator 28.

Now that the physical construction of the invention and the electrical elements and circuits associated therewith have been fully disclosed the operation of the invention may be considered. Prior to actual analysis, a sample to be analyzed is placed on the lower face of filament 18 and the envelope 1 is evacuated to a relatively high vacuum. It will be appreciated that the analysis of minute sample will be facilitated by forming a liquid solution or suspension thereof and painting same upon filament 18. The plate electrodes 8 and 9 and the intermediate electrode 13 are biased from D. C. power supply 31 and R. F. generator 32, which establishes an electrostatic field between plate electrodes 8 and 9 and intermediate electrode 13, for convenience the electric field resulting from the D. C. potential being considered as directed away from intermediate electrode 13. An electric field is also established between end plate 11 and intermediate electrode 13 by virtue of the fact that end plate 11 electrically contacts plate electrodes 8 and 9 and while the electric field between plate electrodes 8 and 9 and intermediate electrode 13 is substantially perpendicular to the faces thereof, it should be noted that end plate 11 is disposed perpendicularly to intermediate electrode 13 and thus the electric field therebetween is generally skew or bowed with a component parallel to the faces of the plate and intermediate electrodes.

Following introduction of the sample in the apparatus, evacuation of the envelope and biasing of the electrodes, all as noted above, filament 18 is heated by an electric current flowing directly therethrough from filament power supply 33 via filament leads 22. Heating of filament 18 ionizes the sample previously placed thereon and ions of the constituent elements or compounds of the sample are formed. The ions formed at filament 18 are attracted therefrom by the negative potential upon intermediate electrode 13 and these ions are thus accelerated toward electrode 13; however, instead of impinging upon intermediate electrode 13 the ions pass directly through same because of the open construction thereof. After passing through intermediate electrode 13 the ions enter a decelerating electric field resulting from the positive D. C. potential on plate electrode 9 and the negative D. C. field impressed upon intermediate electrode 13, the result being that the ions reverse direction in the vicinity of plate electrode 9 and are accelerated toward intermediate electrode 13. The ions again pass through intermediate electrode 13 and are again subjected to a decelerating electric field produced by the relatively positive potential upon plate electrode 8 which causes another reversal of the direction of motion of the ions. It is thus apparent that, considering only the D. C. potentials upon the electrodes, the ions formed at filament 18 will continue to oscillate between plate electrodes 8 and 9 with a substantially undiminished amplitude of oscillation because of the acceleration provided during each half cycle of oscillation. Considering further the effect of the field produced by the D. C. potential, attention is directed to the above-noted configuration of the field in the vicinity of end plate 11. As noted above, the electric field between end plate 11 and intermediate electrode 13 is bowed or skew with respect to the surface of intermediate electrode 13 and thus may be considered as having a component along the electrodes toward collector 19. This component of the electric field accelerates ions leaving filament 18 in a direction away from end plate 11 and because of the lack of any decelerating influence the ions travel along the plate and intermediate electrodes toward collector 19 while oscillating under the influence of the D. C. electric field.

From the above considerations, it is evident that collection of ions produced at filament 18 may be accomplished by proper disposition of collector element 19, or more practically by a proper choice of the relative values of the field producing oscillation and the field producing ion migration along the electrodes. Adjustment of the direction and thus the horizontal component of the D. C. electric field in the vicinity of end plate 11 may be accomplished by varying the configuration of end plate 11 or by the employment of metallic plates of appropriate disposition and configuration to deform the electric field and thereby determine its horizontal component. By these means the number of oscillations which the ions undergo prior to reaching the collector is controlled and also the disposition of the oscillation nodes is determined whereby collection at collector 19 is accomplished.

It will be noted that the displacement of filament 18 from intermediate electrode 13 is equal to the displacement of collector 19 from intermediate electrode 13. As the magnitude of the ion oscillations remains unchanged as the ions travel along the electrodes toward collector 19, the ions will impinge upon collector 19 thereby causing a current to flow in the collector circuit. The current flowing in the collector circuit passes through galvanometer 34 which thereby indicates the quantity of ions impinging upon collector 19.

In order to collect ions of only one predetermined mass corresponding to a known constituent of the sample material ionized, a radio-frequency voltage from R. F. generator 32 is employed. The impression of a radio-frequency voltage upon intermediate electrode 13 causes an alternating electric field to be superimposed upon the D. C. field discussed above. It may be easily shown that positive ions which are in phase with the radio-frequency variations in the electric field and stay in phase through a whole cycle thereof will suffer no net change in their velocities. Thus ions which leave filament 18 when intermediate electrode 13 has zero radio-frequency voltage thereon, pass through intermediate electrode 13 when it has a maximum positive radio-frequency voltage thereon, reach the closest point in their traverse to plate electrode 9 when the radio-frequency voltage on intermediate electrode 13 is zero, return through intermediate electrode 13 when the radio-frequency voltage thereon is at a negative maximum, and approach the nearest point in their traverse to plate electrode 8 when the radio-frequency voltage upon intermediate electrode 13 is zero, will undergo neither a net increase nor decrease in the acceleration imparted by the D. C. electric field during any half cycle of radio-frequency voltage. From a consideration of the action of the radio-frequency electric field upon in-phase ions it will be noted that such ions are subjected to an increased acceleration toward and away from plate electrode 9 with respect to intermediate electrode 13 and a decreased acceleration toward and away from plate 8 which thereby produces a net equal acceleration toward and away from either plate electrode with respect to the other plate electrode. It will be further noted that ions which are out of phase with the radio-frequency voltage will have a net acceleration increase or decrease during a cycle and that these ions will progressively fall further out of phase until they receive a sufficient increase in acceleration that they impinge one of the plate electrodes.

The velocity of ions within the apparatus is dependent upon the charge-to-mass ratio of the ions and the strength of the electric field to which they are subjected and, as the same electric field influences all ions leaving filament 18 at any particular instant, the relative velocity of the ions is proportional only to their relative charge-to-mass ratios. For the purpose of this discussion all ions may be assumed to have the same charge and thus the ion velocity is dependent only upon the mass thereof. In order for ions to remain in phase with the radio-frequency voltage the ions must make one complete oscillation in one cycle of voltage and, as the velocity of the ions is dependent upon their mass, only ions of one particular mass will stay in phase with the radio-frequency voltage of any particular frequency. Ions of any mass other than the one which acquires the proper average velocity to stay in phase with the radio-frequency voltage become progressively further and further out of phase at each cycle and eventually receive sufficient acceleration during one-half cycle to impinge upon one of plate electrodes 8 or 9. Thus only ions of a particular mass corresponding to one particular frequency of the radio-frequency voltage are collected at collector 19 and as this frequency is inversely proportional to the square root of the mass it is possible to accurately identify the mass of the particular ion impinging the collector 19 at any predetermined frequency of the radio-frequency voltage. In practice it has been found advantageous to calibrate the R. F. generator 32 directly in mass units so that the frequency may be adjusted to any particular setting corresponding to a specific mass and no calculations are necessary to identify the ions collected. With the R. F. generator variable frequency control calibrated directly in mass units it is only necessary to successively position the control on the various masses and note the galvanometer reading for each in order to analyze the sample and identify the ions formed therefrom.

Mass analysis, or identification of the constituents of a sample of unknown quality is made simple and rapid by the present invention. In addition, the size, complexity, and cost of the equipment required for mass analysis is materially reduced by the present invention. Many other advantages, as well as variations in the structural details and mode of operation, all within the scope of the invention, will suggest themselves to those skilled in the art from a study of the present disclosure and although the invention has been disclosed with respect to only one preferred embodiment it is not intended to so limit the invention; attention being directed to the following claims for a precise delineation of the scope of the invention.

What is claimed is:

1. Analyzing apparatus comprising a pair of parallel spaced electrodes, means establishing a constant electric field directed perpendicularly to said electrodes from a position equidistant therebetween, means for ionizing a sample to be analyzed and subjecting said ions to the effects of said electric field whereby said ions oscillate between said electrodes, means for imparting a velocity to said ions parallel to said electrodes whereby said ions travel between said electrodes, means for varying the amplitude of said electric field at a known frequency whereby only ions of a mass inversely proportional to the square of the frequency continue oscillatory travel between said electrodes without impinging thereon, and means to collect the ions having a mass proportional to said frequency and to indicate the current produced thereby.

2. Mass analyzing apparatus comprising a pair of parallel spaced electrodes having a positive potential impressed thereon, a perforated electrode disposed intermediate and parallel to said pair of electrodes and at a negative potential with respect thereto whereby an electric field is established perpendicular to said electrodes, means supplying ions of a sample to be tested adjacent the perforated electrode presented face of one of said pair of electrodes whereby said ions are accelerated and constrained to oscillate between said pair of electrodes through said perforated electrode, ion collection means disposed adjacent the perforated electrode presented face of one of said pair of electrodes and separated therefrom by substantially the same distance as separates the ion supply means from the electrode adjacent thereto, means urging said ions toward said ion collection means from said ion supply means, and means varying the potential difference between said perforated electrode and said pair of electrodes at a known frequency whereby only ions of a particular known mass are unaffected thereby and impinge said collector.

3. Mass analyzing apparatus comprising means establishing a region defining a pair of constant electrostatic fields having a common negative boundary, an ion source for ionizing a sample to be analyzed and injecting the ions into said electrostatic field region whereby positive ions of said sample oscillate within said region under the influence of said electrostatic fields, means for varying the magnitude of said electrostatic fields in a predetermined cyclic manner whereby ions of a predetermined mass have a constant magnitude of oscillation, and means for collecting the ions having a constant magnitude of oscillation.

4. Mass analyzing apparatus comprising means establishing a region defining a pair of contiguous opposed electrostatic fields, ion source means providing ions of a sample to be analyzed within said region adjacent the boundary thereof whereby said ions oscillate under the influence of said electrostatic fields, means for imparting a velocity to said ions in a direction normal to said electrostatic fields, means for cyclically varying the strength of said electrostatic fields at a known frequency whereby only ions of one predetermined mass retain constant amplitudes of oscillation, means for collecting the ions having constant amplitudes of oscillation, and means for changing the frequency of said cyclic variation in electrostatic field strength to collect ions of other predetermined masses.

5. Mass analyzing apparatus comprising ion source means for ionizing a sample to be analyzed, first electrostatic field producing means for accelerating ions from said ion source in a predetermined general direction with a velocity proportional to the relative masses thereof, collection means disposed at a distance from said ion source in the general direction of travel of said ions, second electrostatic field producing means operating at a predetermined frequency to accelerate ions of all but one mass which is inversely proportional to the square of said operating frequency, and means for stopping said accelerated ions short of said collector whereby only ions of one mass impinge said collector.

6. A mass analyzer apparatus as set forth in claim 5 further characterized by frequency control means connected to said second electrostatic field producing means for varying the frequency of operation thereof whereby ions of masses corresponding to different frequencies impinge said collector, and indicating means connected to said collector means for indicating the collection and relative amount of ions of different masses impinging thereon.

7. Mass analyzing apparatus comprising an evacuated envelope, a pair of parallel spaced plates disposed within said envelope, a mesh electrode disposed intermediate and parallel to said plates and equidistant from each other, power supply means impressing a negative direct current potential upon said electrode relative to said plates, means establishing an electrostatic field parallel to said plates and electrode, ion source means interior to said envelope and introducing ions of a substance to be analyzed into the region between said plates and said electrode whereby said ions oscillate between said plates through said mesh electrode and travel along said plates under the influence of said electrostatic field, ion collection means disposed in the region between said plates and said electrode, and a power supply providing alternating current voltage and connected between said plates and said electrode whereby ions out of phase therewith experience increased amplitudes of oscillation and only ions of a predetermined mass maintain constant oscillation amplitude and reach said collector.

8. A mass analyzer comprising an evacuated envelope, a pair of spaced parallel plates within said envelope, a mesh electrode disposed equidistant from each of said electrodes intermediate thereto and parallel to said electrodes, an ion source and an ion collector each disposed adjacent one of said plates intermediate the plate and said mesh electrode, said source and collector being separated along said plate, electrostatic field producing means adjacent said ion source and urging ions from said source toward said ion collector, and power supply means connected between said plates and said mesh electrode and impressing a direct current potential therebetween whereby said mesh electrode is maintained at a negative potential relative to said plates and an alternating current potential therebetween whereby the amount by which said mesh electrode is negative with respect to said plates is varied and thereby constraining ions from said ion source traveling toward said collector to oscillate between said plates through said mesh electrode with ions of a predetermined mass being in phase with said alternating current potential and impinging upon said collector.

9. A mass analyzer comprising an evacuated envelope, a pair of spaced parallel plates disposed within said envelope, a first electrode electrically connecting said plates at one end thereof, a second electrode having an open mesh structure disposed intermediate said plates, said second electrode being equidistant from said plates and insulated therefrom, first power supply means connected between said second electrode and said plates and impressing a direct current potential therebetween with said second electrode being maintained at a negative potential relative to said plates and first electrode, second power supply means connected between said plates and second electrode and impressing therebetween an alternating current potential of a lesser magnitude than said direct current potential, an ion source adjacent one of said plates and intermediate said plate and second electrode, said source being also adjacent said first electrode and being electrically connected to said plate, an ion collector disposed adjacent the same plate as said ion source and separated from said source in a direction away from said first electrode, an indicating means connected to said collector and indicating the ion current of ions of a predetermined mass passing through the analyzer in phase with said alternating current potential.

10. A mass analyzer as claimed in claim 9 further defined by said second power supply means having a controlled variable frequency output potential whereby ions of different predetermined masses are in phase with said alternating current potential applied between said plates and second electrode and are collected at said ion collector and the relative amount thereof indicated by said indicating means.

WILLIAM E. GLENN, Jr.

REFERENCES CITED

The following references are of record in the file of this patent:

UNITED STATES PATENTS

| Number | Name | Date |
|---|---|---|
| 2,370,673 | Langmuir | Mar. 6, 1945 |